3,458,632
METHOD OF INDUCING ANTIANDROGENIC ACTIVITY
Gerard Nomine, Noisy-le-Sec, and Robert Bucourt, Clichy-sous-Bois, France, assignors to Roussel—UCLAF, Paris, France, a corporation of France
No Drawing. Filed June 9, 1966, Ser. No. 556,257
Claims priority, application France, June 15, 1965, 20,841
Int. Cl. A61k 17/06
U.S. Cl. 424—241       2 Claims

ABSTRACT OF THE DISCLOSURE

Method of inducing antiandrogenic activity in mammals by administering an effective amount of 10,11-lactone of 17α-ethynyl-Δ⁴-estrene-11β,17β-diol-3-one-10β-carboxylic acid of the formula

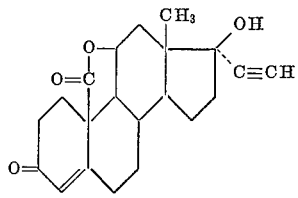

I

PRIOR ART

Numerous compounds having antiandrogenic properties are known but most of the known compounds have the disadvantage of also possessing endocrinic activities among other activities. For example, progesterone or 6-chloro - 6 - dehydro - 17α - hydroxy - progesterone possess obviously progestative properties, estradiol derivatives have an estrogenic activity and A-nor-testosterone and 17-methyl-B-nor testosterone possess androgenic activity. Other antiandrogenes, such as testololactones possess antiandrogenic activity when administered in small doses, but this acitvity is reversed at increased doses. 10,11 - lactone of 17α - ethynyl - Δ⁴ - estrene - 11β,17β-diol-3-one-10β-carboxylic acid has the two-fold advantage of not possessing parasitic endocrinic activity, such as androgenic activity, estrogenic activity or progestomimetic activity while having a constant antiandrogenic activity in proportion to the dose administered. The said product has the further advantage of being active when administered orally which greatly facilitates administration.

OBJECTS OF THE INVENTION

It is an object of the invention to provide novel antiandrogenic compositions which do not possess other undesired activities.

It is another object of the invention to provide a novel method of treating hyperandrogenia in mammals.

It is a further object of the invention to provide a novel process for the preparation of 10,11-lactone of 17α - ethynyl - Δ⁴ - estrene - 11β,17β - diol - 3 - one - 10β-carboxylic acid.

These and other objects and advantages of the invention will become obvious from the following detailed description.

THE INVENTION

The novel antiandrogenic compositions of the invention are comprised of 10,11-lactone of 17α-ethynyl-Δ⁴-estrene-11β,17β-diol-3-one-10β-carboxylic acid and a major amount of a pharmaceutical carrier. The compositions may be in the form of injectable solutions or suspensions, put up in ampoules or multiple-dose flacons, in the form of tablets, coated tablets, sublingual tablets and suppositories prepared in the usual manner. The compositions preferably contain 10 to 25% by weight of the lactone or 100 to 500 mg. per dose.

The novel method of the invention for the treatment of hyperandrogenia in mammals comprises administering to mammals an effective amount of 10,11-lactone of 17α-ethynyl - Δ⁴ - estrene - 11β,17β - diol - 3 - one - 10β - carboxylic acid. The said lactone may be administered orally, perlingually, transcutaneously or rectally. The usual useful dosage is 1.45 to 7.25 mg./kg. per individual dose and 2.9 to 14.5 mg./kg. per day for the adult depending upon the method of administration.

The novel process of the invention for the preparation of 10,11-lactone of 17α-ethynyl-Δ⁴-estrene-11β,17β-diol-3-one-10β-carboxylic acid comprises oxidizing 10,11-lactone of 3 - ethylenedioxy - Δ⁵ - estrene - 11β,17β - diol-10β-carboxylic acid to form 10,11-lactone of 3-ethylenedioxy - Δ⁵ - estrene - 11β - ol - 17 - one - 10β - carboxylic acid, reacting the latter with an ethynylation agent to form 10,11-lactone of 3-ethylenedioxy-17α-ethynyl-Δ⁵-estrene-11β,17β-diol-10β-carboxylic acid and hydrolyzing the latter under acidic conditions to form 10,11-lactone of 17α - ethynyl - Δ⁴ - estrene - 11β,17β - diol - 3 - one-10β-carboxylic acid. The reaction scheme is illustrated in Table I.

TABLE I

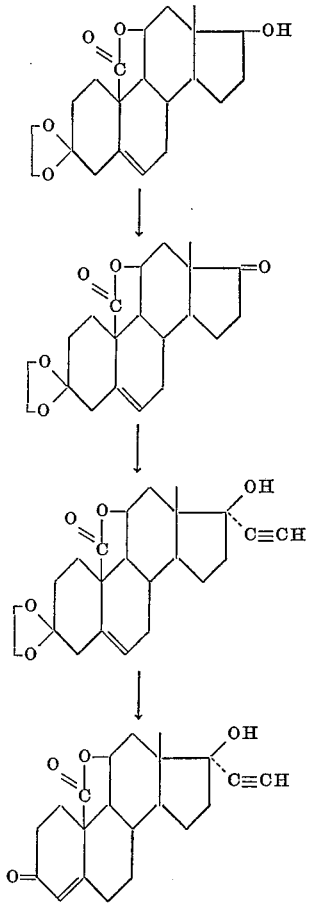

The oxidation of 10,11-lactone of 3-ethylenedioxy-Δ⁵-estrene-11β,17β-diol-10β-carboxylic acid is advantageously effected with chromic acid in the presence of a tertiary base such as pyridine. It can also be effected by the Oppenauer oxidation with an aluminum alcoholate.

The ethynylation of 10,11-lactone of 3-ethylenedioxy Δ⁵-estrene-11β-ol-17-one-10β-carboxylic acid may be effected with an alkali metal acetylide such as potassium or sodium acetylide or with a magnesium ethynyl halide such as the bromide or iodide which gives good yields. Surprisingly, the lactone group is not affected by the Grignard reagents.

The acid hydrolysis of 10,11-lactone of 3-ethylene-dioxy-17α-ethynyl-Δ⁵-estrene-11β,17β-diol - 10β - carboxylic acid may be effected in an aqueous protonic solvent, such as aqueous acetic acid or an aqueous lower alkanol such as aqueous methanol or ethanol in the presence of a strong acid such as perchloric acid, hydrochloric acid, sulfuric acid, p-toluene-sulfonic acid, etc.

In the following example, there are described several preferred embodiments to illustrate the invention. However, it should be understood that the invention is not intended to be limited to the specific embodiments.

Example I.—Preparation of 10,11-lactone of 17α-ethynyl-Δ⁴-estrene-11β,17β-diol-3-one-10β-carboxylic acid Step A. Preparation of 10,11-lactone of 3-ethylene dioxy-Δ⁵-estrene-11β-ol-17-one-10β-carboxylic acid.—3.2 g. of chromic acid were suspended in 32 cc. of pyridine cooled to about 0° C. and the suspension was agitated for ¼ hour. Then a solution of 3.2 g. of 10,11-lactone of 3-ethylenedioxy-Δ⁵-estrene-11β,17β-diol-10β-carboxylic acid (prepared by the process of Patent No. 3,150,127), dissolved in 32 cc. of redistilled pyridine, was slowly added to the suspension.

The reaction mixture was agitated for 16 hours at room temperature, and after 3.2 cc. of methanol were added, the agitation was continued for another 15 minutes. Then the reaction mixture was extracted with methylene chloride and the extract was washed with water, dried and subjected to chromatography through magnesium silicate and eluted with methylene chloride containing 3% of pyridine to obtain 3.092 g. of product, which was utilized as such for the next step of the synthesis.

For the purpose of analysis, the product obtained was triturated in methyl alcohol-isopropyl ether mixture (1:4, vacuum filtered, washed and dried to obtain 10,11-lactone of 3-ethylenedioxy-Δ⁵-estrene-11β-ol-17-one-10β-carboxylic acid, having a melting point of 236° C. and a specific rotation of $[\alpha]_D^{20} = +85° \pm 1°$ (c.=0.4% in methanol).

*Analysis.*—$C_{21}H_{26}O_5$; molecular weight=358.42. Calculated: C, 70.36%; H, 7.31%. Found: C, 70.0%; H, 7.2%.

Step B. Preparation of 10-11 lactone of 3-ethylenedioxy-17α-ethynyl-Δ⁵-estrene-11β,17β-diol - 10β - carboxylic acid.—3 g. of magnesium were introduced into 165 cc. of anhydrous tetrahydrofuran, and methyl bromide was allowed to bubble through the reaction mixture until the magnesium had completely disappeared. Then the current of methyl bromide was replaced by a current of acetylene which current was allowed to bubble through the reaction mixture for 3 hours while maintaining a temperature of about 35° C. Thereafter, the reaction solution was cooled and decanted. 2.9 g. of 10,11-lactone of 3-ethylenedioxy-Δ⁵-estrene-11β-ol-17-one-10β-carboxylic acid were introduced into 160 cc. of the said reaction solution and the mixture was refluxed for 2 hours, then cooled and poured into an aqueous solution of ammonium chloride. The reaction mixture was then extracted with methylene chloride and the extract was washed with water, dried and purified by passing it through a column of magnesium silicate to obtain 3.042 g. of 10,11-lactone of 3-ethylenedioxy-17α-ethynyl-Δ⁵-estrene-11β,17β-diol-10β-carboxylic acid.

For analysis, the said product was triturated in a methyl alcohol-isopropyl ether mixture (1:4), then vacuum filtered and washed to obtain 2.591 g., (a yield of 83% of theory) of 10,11-lactone of 3-ethylenedioxy-17α-ethynyl-Δ⁵-estrene-11β,17β-diol-10β-carboxylic acid having a melting point of 270° C. and a specific rotation of $$[\alpha]_D^{20} = -19° \pm 1°$$

(c.=0.5% in tetrahydrofuran.)

The product was white and was insoluble in water and dilute acids, soluble in hot alcohol and hot acetone, and soluble in cold chloroform.

*Analysis.*—$C_{23}H_{28}O_5$; molecular weight: 384.45. Calculated: C, 71.85%; H, 7.3%. Found: C, 71.8%; H, 7.3%.

Step C. Preparation of 10,11-lactone of 17α-ethynyl-Δ⁴-estrene-11β,17β-diol-3-one-10β-carboxylic acid.—0.7 g. of 10,11-lactone of 3-ethylenedioxy-17α-ethynyl-Δ⁵-estrene-11β,17β-diol-10β-carboxylic acid were introduced into 70 cc. of acetic acid containing 10% perchloric acid (at 55° Bé). The reaction mixture was agitated for 2 hours under an atmosphere of nitrogen at room temperature and then 350 cc. of methylene chloride and 150 cc. of water were added to the reaction mixture. The reaction mixture was then made alkaline by addition of sodium bicarbonate, decanted, washed and dried. The product was dissolved in methylene chloride, chromatographed through magnesium silicate and eluted with methylene chloride containing 2% of acetone, to obtain 290 mg. of 10,11-lactone of 17α-ethynyl-Δ⁴-estrene-11β,17β-diol-3-one-10β-carboxylic acid having a melting point of 232° C. and a specific rotation of $[\alpha]_D^{20} = +149.5° \pm 1°$ (c.=0.5% in methanol).

The product was white and was insoluble in water and dilute aqueous acids, slightly soluble in hot alcohol and acetone, and soluble in cold chloroform.

*Analysis.*—$C_{21}H_{24}O_4$; molecular weight=340.4. Calculated: C, 74.09%; H, 7.11%. Found: C, 74.0%; H, 7.3%.

PHARMACOLOGICAL DATA

The antiandrogenic activity was determined on castrated male rats according to the Lerner method described by Dorfman in "Methods in Hormones Research," II, page 320. Male rats, about 4 weeks old, were castrated and treatment started on the day after the castration and lasted 7 days. On the 8th day, the animals were sacrificed, and the following organs were removed and weighed: prostate gland, seminal vesicles and levator ani. The 10,11-lactone of 17α-ethynyl-Δ⁴-estrene-11β,17β-diol-3-one-10β-carboxylic acid, (product A), was administered orally at doses of 1 and 5 mg. per rat per day, as a suspension in a dispersive aqueous liquid, simultaneously with 50γ of testosterone propionate per rate per day, administered subcutaneously, as a solution in olive oil admixed with 5% benzyl alcohol. The groups of rats treated were arranged as follows:

(1) One group of control animals received the dispersive aqueous liquid;

(2) One group of rats received 50γ of testosterone propionate administered subcutaneously;

(3) One group of rats received 1 mg. of product A by oral administration;

(4) One group of rats received 5 mg. of product A by oral administration;

(5) One group of rats received 1 mg. of product A by oral administration and 50γ of testosterone propionate by subcutaneous administration;

(6) One group of rats received 5 mg. of product A by oral administration and 50γ of testosterone propionate by subcutaneous administration. The results are summarized in Table II.

TABLE II

| Treatment | Fresh Levator Ani in g. per 1000 g. of Rat | Dry Levator Ani in g. per 1000 g. of rat | Seminal Vesicles mg. | Ventral Prostate mg. |
|---|---|---|---|---|
| Control | 0.239 | 0.049 | 4.4 | 10.9 |
| 50γ of testosterone propionate | 0.467 | 0.097 | 87.0 | 95.3 |
| 1 mg. of Product A | 0.241 | 0.054 | 8.6 | 11.5 |
| 5 mg. of Product A | 0.255 | 0.052 | 11.7 | 18.2 |
| 1 mg. of Product A and 50γ of testosterone propionate | 0.460 (−2%) | 0.094 (−3%) | 71.0 (−18%) | 100.5 (+5%) |
| 5 mg. of Product A and 50γ of testosterone propionate | 0.363 (−22%) | 0.078 (−20%) | 44.9 (−48%) | 71.6 (−25%) |

Table II establishes that 10,11-lactone of 17α-ethynyl-Δ⁴-estrene-11β,17β-diol-3-one-10β-carboxylic acid exerts a distinct antiandrogenic and antianabolic activity at a dose of 5 mg. when administered with testosterone propionate and when administered alone, it has practically no anabolic and androgenic effect.

Various modifications of the compositions and method of the invention may be made without departing from the spirit or scope thereof.

We claim:

1. A method of inducing antiandrogenic activity in mammals which comprises administering to mammals an antiandrogenically effective amount of 10,11-lactone of 17α - ethynyl - Δ⁴ - estrene - 11β,17β - diol - 3 - one-10β-carboxylic acid.

2. The method of claim 1 wherein the amount of the 10,11-lactone administered is 2.9 to 14.5 mg./kg. per day.

References Cited

UNITED STATES PATENTS 3,167,548   1/1965   Cross _____ 260—239.57

FRANK CACCIAPAGLIA, JR., Primary Examiner